US011286998B2

(12) United States Patent
Takahashi

(10) Patent No.: US 11,286,998 B2
(45) Date of Patent: Mar. 29, 2022

(54) CONTROL DEVICE FOR CLUTCH

(71) Applicant: ISUZU MOTORS LIMITED, Tokyo (JP)

(72) Inventor: Yusuke Takahashi, Fujisawa (JP)

(73) Assignee: ISUZU MOTORS LIMITED, Tokyo (JP)

(*) Notice: Subject to any disclaimer, the term of this patent is extended or adjusted under 35 U.S.C. 154(b) by 166 days.

(21) Appl. No.: 16/753,719

(22) PCT Filed: Oct. 5, 2018

(86) PCT No.: PCT/JP2018/037294
§ 371 (c)(1),
(2) Date: Apr. 3, 2020

(87) PCT Pub. No.: WO2019/070046
PCT Pub. Date: Apr. 11, 2019

(65) Prior Publication Data
US 2020/0256407 A1 Aug. 13, 2020

(30) Foreign Application Priority Data
Oct. 5, 2017 (JP) .............................. JP2017-195050

(51) Int. Cl.
F16D 48/06 (2006.01)
F01P 7/08 (2006.01)
(Continued)

(52) U.S. Cl.
CPC ............ F16D 48/064 (2013.01); F01P 7/084 (2013.01); F16D 35/024 (2013.01);
(Continued)

(58) Field of Classification Search
CPC .... F16D 48/064; F16D 48/066; F16D 35/024; F16D 2121/20; F16D 2500/10418;
(Continued)

(56) References Cited

U.S. PATENT DOCUMENTS 6,807,926 B2 * 10/2004 Shiozaki ............... F04D 27/004
123/41.12
9,353,673 B2 * 5/2016 Ge ........................ F04D 19/002
(Continued)

FOREIGN PATENT DOCUMENTS

CN 1807917 A 7/2006
CN 1807918 A 7/2006
(Continued)

OTHER PUBLICATIONS

First Office Action for related CN App No. 201880064714.5 dated Dec. 28, 2020, 13, pgs.
(Continued)

Primary Examiner — Timothy Hannon
(74) Attorney, Agent, or Firm — Procopio, Cory, Hargreaves & Savitch LLP

(57) ABSTRACT

A control device for a clutch, which is provided between an operation machine and a drive shaft of an engine, controls an operation of a valve member for opening and closing an oil supply port through which an oil reservoir chamber and a torque transmission chamber communicate. The control device refers to a desired rotation speed of a rotating body of the operation machine and to an acquired rotation speed of the rotating body of the operation machine, calculates a proportional term manipulated variable based on a deviation between an angular acceleration of the rotating body and a
(Continued)

desired angular acceleration, and controls the operation of the valve member on the basis of this calculated proportional term manipulated variable.

6 Claims, 4 Drawing Sheets

(51) Int. Cl.
    *F16D 35/02*     (2006.01)
    *F16D 121/20*     (2012.01)

(52) U.S. Cl.
    CPC ........ *F16D 48/066* (2013.01); *F16D 2121/20* (2013.01); *F16D 2500/10418* (2013.01); *F16D 2500/10468* (2013.01); *F16D 2500/3067* (2013.01); *F16D 2500/30426* (2013.01); *F16D 2500/30428* (2013.01); *F16D 2500/5041* (2013.01); *F16D 2500/70442* (2013.01); *F16D 2500/70444* (2013.01); *F16D 2500/70631* (2013.01)

(58) Field of Classification Search
    CPC . F16D 2500/10468; F16D 2500/30426; F16D 2500/30428; F16D 2500/3067; F16D 2500/5041; F16D 2500/70442; F16D 2500/70444; F16D 2500/70631; F01P 7/084

See application file for complete search history.

(56) References Cited

U.S. PATENT DOCUMENTS

| | | |
|---|---|---|
| 2004/0223851 A1 | 11/2004 | Shiozaki et al. |
| 2006/0096554 A1 | 5/2006 | Shiozaki |
| 2006/0124424 A1 | 6/2006 | Inoue et al. |
| 2007/0068762 A1* | 3/2007 | Bhat ..................... F16D 35/024 |
| | | 192/58.61 |
| 2018/0298805 A1 | 10/2018 | Kinugawa et al. |

FOREIGN PATENT DOCUMENTS

| | | |
|---|---|---|
| JP | 2004340373 A | 12/2004 |
| JP | 2007297926 A | 11/2007 |
| JP | 2009103000 A | 5/2009 |
| WO | 2017110644 A1 | 6/2017 |

OTHER PUBLICATIONS

International Search Report and Written Opinion for related PCT App No. PCT/JP2018/037294 dated Dec. 25, 2018, 8 pgs.

* cited by examiner

CONTROL DEVICE FOR CLUTCH

CROSS-REFERENCE TO RELATED APPLICATIONS

This application is a U.S. National Stage entry of PCT Application No: PCT/JP2018/037294 filed on Oct. 5, 2018, which claims priority to Japanese Patent Application No. 2017-195050, filed Oct. 5, 2017, the contents of which are incorporated herein by reference.

TECHNICAL FIELD

The present disclosure relates to a control device for a clutch provided to transmit power from a power source such as an engine to an operation machine such as a cooling fan.

BACKGROUND ART

A cooling fan of an engine is attached to a drive shaft connected to an output shaft of the engine via a fluid clutch (or a viscous clutch). The clutch is a power transmission device that switches between a connected state and a disconnected state according to an amount of oil (for example, silicone oil) in a torque transmission chamber. In this clutch, various proposals have been made to open and close a flow path (oil supply port) of the oil from an oil reservoir chamber to the torque transmission chamber using an electromagnetic force.

Patent Literature 1 discloses a clutch having a mechanism that opens and closes the oil supply port by a valve member operated by an electromagnet. In this clutch, the valve member includes a leaf spring and an armature, and when the electromagnet is OFF (non-excited), the oil supply port is closed by an action of the leaf spring, and when the electromagnet is ON (excited), the oil supply port is opened by the armature being pulled toward a magnetic loop element side against a spring force of the leaf spring. Further, in this clutch, an optimum fan rotation speed is determined with reference to a coolant temperature of a radiator, a rotation speed of the cooling fan, a vehicle speed, an engine rotation speed, and the like, the valve member is moved accordingly to vary a fan rotation, and an operation of the valve member is feedback-controlled at a detected fan rotation speed.

CITATION LIST

Patent Document

Patent Literature 1: JP-A-2004-340373

SUMMARY OF THE INVENTION

Technical Problem

In the electromagnetically controlled clutch as described above, there is a demand for more rapidly bringing the amount of oil in the torque transmission chamber closer to a desired amount and further improving a response followability.

An object of the present disclosure is to provide a control device which enables to improve a response followability in a clutch provided between a drive shaft, which rotates by a power source such as an engine, and an operation machine such as a cooling fan.

Solution to Problem

The present inventor has conducted intensive studies to achieve the above object, and has found that a more excellent response followability can be obtained by focusing attention on an angular acceleration of a rotating body of the operation machine to which the drive shaft is connected via the clutch and controlling an operation of a valve member of the clutch.

According to an aspect of the present disclosure, there is provided a control device for a clutch provided between a drive shaft and an operation machine, in which the control device is configured to control an operation of a valve member for opening and closing an oil supply port that communicates an oil reservoir chamber with a torque transmission chamber so as to adjust an amount of oil supplied from the oil reservoir chamber to the torque transmission chamber in the clutch, and the control device includes:
  a first calculation unit that calculates a desired rotation speed of a rotating body of the operation machine with reference to acquired information on the operation machine;
  a second calculation unit that calculates a proportional term manipulated variable based on a deviation between an angular acceleration and a desired angular acceleration of the rotating body with reference to the desired rotation speed of the rotating body of the operation machine calculated by the first calculation unit and an acquired rotation speed of the rotating body of the operation machine; and
  a valve member control unit that controls an operation of the valve member based on the proportional term manipulated variable calculated by the second calculation unit.

Preferably, the control device further includes:
  a third calculation unit that calculates a feedforward manipulated variable with reference to the desired rotation speed of the rotating body of the operation machine calculated by the first calculation unit and an acquired rotation speed of the drive shaft; and
  a fourth calculation unit that calculates an integral term manipulated variable with reference to the desired rotation speed of the rotating body of the operation machine calculated by the first calculation unit and an acquired rotation speed of the rotating body of the operation machine, in which the valve member control unit controls an operation of the valve member based on the proportional term manipulated variable calculated by the second calculation unit, the feed forward manipulated variable calculated by the third calculation unit, and the integral term manipulated variable calculated by the fourth calculation unit.

Preferably, the drive shaft is an output shaft of an engine or a rotating shaft body connected to the output shaft to be rotated. Preferably, the operation machine is a cooling fan of the engine. Alternatively, the operation machine may be a coolant pump of the engine.

DESCRIPTION OF EMBODIMENTS

Hereinafter, an embodiment of the present disclosure is described with reference to the drawings.

Figure 1:
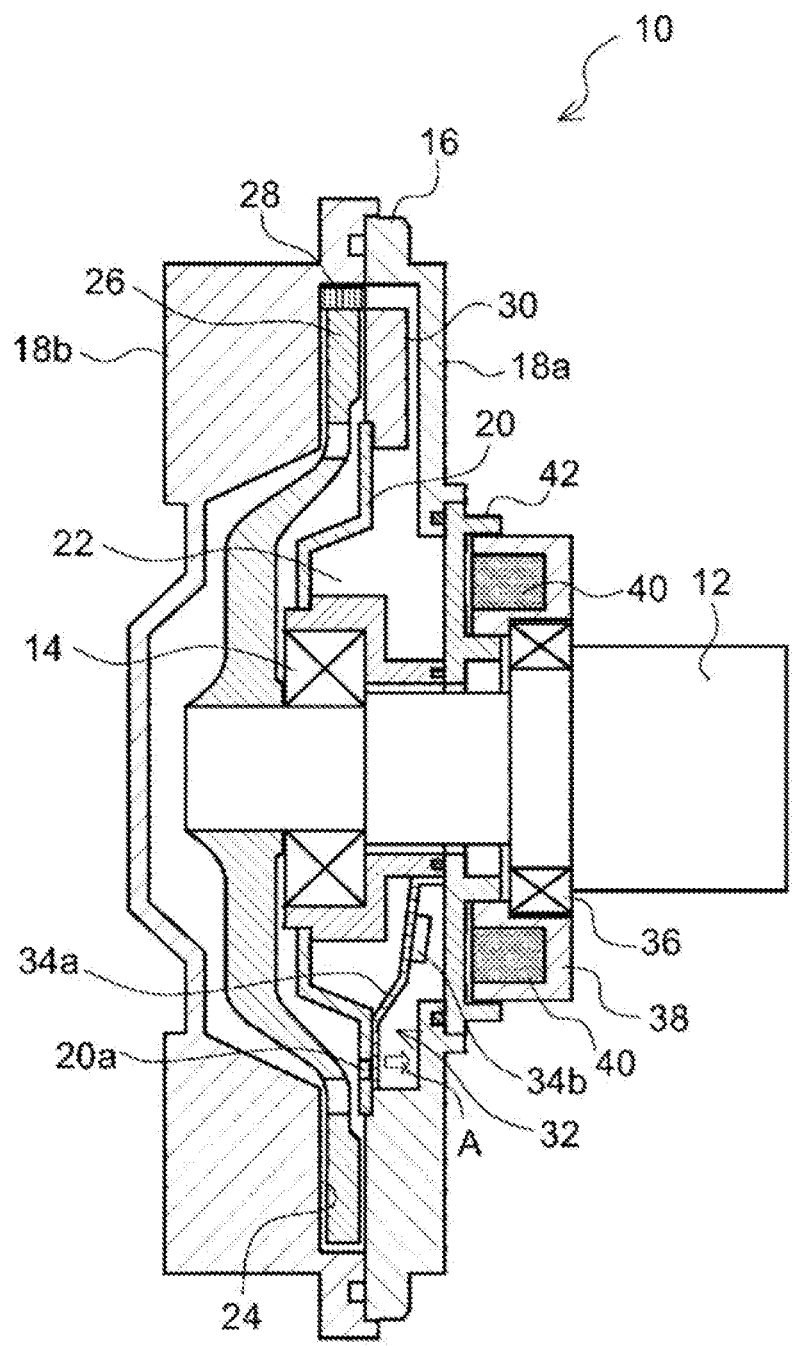
FIG. 1 is a schematic configuration diagram of a clutch controlled by a control device according to an embodiment.
Figure 2:
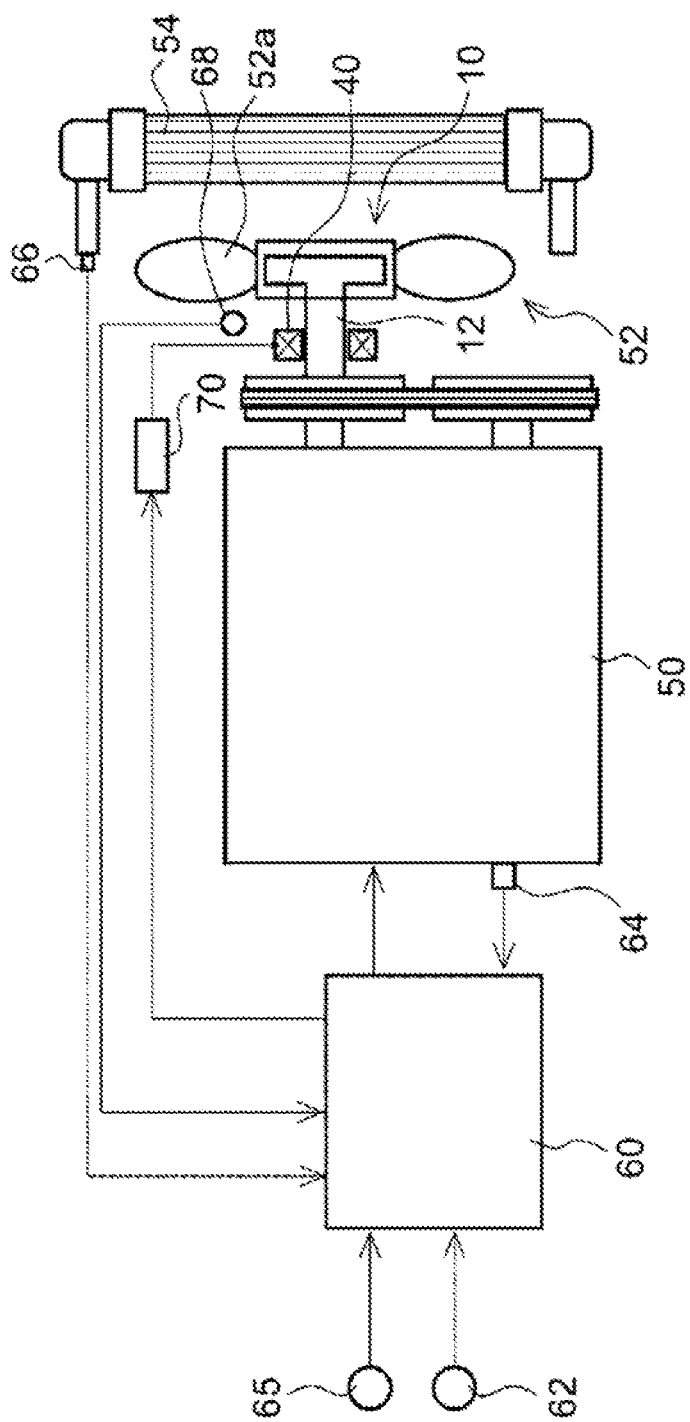
FIG. 2 is an overall configuration diagram of a system including the clutch of FIG. 1.

The present embodiment is an example in which a control device for a clutch is applied to a fluid clutch provided between a drive shaft that is rotationally driven by an output shaft of an engine and a cooling fan. FIG. 1 shows a schematic configuration of a clutch controlled by the control device according to the embodiment. FIG. 2 shows an overall configuration of a system including the clutch of FIG. 1 according to the embodiment.

In a clutch 10 shown in FIG. 1, a case member 16 is supported so as to be relatively rotatable via a bearing 14 to a rotating shaft body (drive shaft) 12 that is rotated by power of an engine, that is, a driving force. The case member 16 includes a case 18a and a cover 18b. The inside of the case member 16 is divided into two sections by a partition plate 20. One section is an oil reservoir chamber 22 and the other section is a torque transmission chamber 24. An oil supply port 20a communicating between the oil reservoir chamber 22 and the torque transmission chamber 24 is formed in the partition plate 20. In the torque transmission chamber 24, a drive disk 26 fixed to a tip end of the rotating shaft body 12 is accommodated so that a torque transmission gap is formed between the drive disk 26 and an inner peripheral surface of the torque transmission chamber 24. Although not shown, in the torque transmission gap, a labyrinth groove on the inner peripheral surface of the torque transmission chamber and a labyrinth groove on an outer surface of the drive disk 26 are formed so as to face each other. Incidentally, a dam 28 is provided on a part of an inner peripheral wall surface of the cover 18b facing an outer peripheral wall portion of the drive disk 26 (an outer peripheral portion thereof) where oil is collected at the time of rotation. An oil recovery vent 30 for recovering oil discharged from the torque transmission chamber 24 into the oil reservoir chamber 22 is formed in the case 18a.

A valve member 32 for opening and closing the oil supply port 20a is provided in the clutch 10. Here, the valve member 32 is disposed in the oil reservoir chamber 22, but the valve member 32 is not limited thereto. The valve member 32 includes a leaf spring 34a and an armature 34b. Incidentally, one end of the leaf spring 34a is attached to the case 18a, and the other end of the leaf spring 34a is formed as a free end so as to be able to open and close the oil supply port 20a.

On an engine side of the case member 16, an electromagnet 40 is supported by an electromagnet support body 38 supported by the rotating shaft body 12 via a bearing 36. Further, on the same side of the case member 16, a ring-shaped magnetic loop element (magnetic body) 42 incorporated in the case 18a is attached to face the armature 34b of the valve member 32, and a part of an electromagnet support body 38 is fitted to the magnetic loop element 42. That is, in order to efficiently transmit a magnetic flux of the electromagnet 40 to the armature 34b of the valve member 32, an operation mechanism (an operation means) of the valve member 32 is configured using the ring-shaped magnetic loop element. 42. That is, the oil supply port is configured to be opened and closed by an electromagnetic valve.

In the clutch 10 having the above configuration, when the electromagnet 40 is OFF (non-excited), the oil supply port 20a is closed by the armature 34b being separated from the magnetic loop element 42 by an action of the leaf spring 34a as shown in FIG. 1. As a result, the supply of the oil into the torque transmission chamber 24 is stopped. When the electromagnet 40 is ON (excited), the armature 34b is drawn toward a magnetic loop element 42 side against a spring force of the leaf spring 34a, whereby the leaf spring 34a is bent in a direction indicated by an arrow A in FIG. 1 and is pressed against a case 18a side to open the oil supply port 20a. As a result, the oil is supplied from the oil reservoir chamber 22 to the torque transmission chamber 24.

An amount of oil in the torque transmission chamber 24 is determined by a ratio of an amount of oil guided from the oil reservoir chamber 22 to the torque transmission chamber 24 via the oil supply port 20a to an amount of oil discharged from the torque transmission chamber 24 to the oil reservoir chamber 22 via the oil recovery vent 30 by a rotation of the drive disk 26. The amount of oil guided to the torque transmission chamber 24 via the oil supply port 20a is determined by an opening/closing degree of the oil supply port 20a by the valve member 32. The amount of oil discharged from the torque transmission chamber 24 to the oil reservoir chamber 22 via the oil recovery vent 30 is determined by a relative rotation speed difference between the drive disk 26 and the cover member 16.

Next, an engine system including the clutch will be described with reference to FIG. 2. As described above, the clutch 10 is provided between an engine 50 and a cooling fan 52. The rotating shaft body 12 is configured to rotate by receiving power or a driving force from an output shaft of the engine 50. Therefore, the rotation speed of the rotating shaft body 12 has a correspondence with an engine rotation speed. The cooling fan 52 is disposed to face a radiator 54. As described above, in this system, with respect to the clutch 10, the rotating shaft body 12 is on a primary side (an input side), and a fan 52a of the cooling fan 52 is on a secondary side (an output side).

The engine system mainly provided with such a configuration includes an electronic control unit (hereinafter referred to as ECU) 60. The ECU 60 includes an arithmetic device, a storage device, an input/output port, and the like, and has a configuration as a so-called computer. A vehicle speed sensor 62, an engine rotation speed sensor 64, an engine load sensor 65, a temperature sensor 66 for detecting a temperature of a coolant of the engine, a rotation speed sensor 68 for detecting a rotation speed of the cooling fan 52, and the like are electrically connected to the ECU 60, and an output from each sensor and the like is input. Incidentally, the temperature sensor for detecting the temperature of the coolant of the engine is not limited to being provided in the radiator, and may be provided in an engine main body. In addition to an operation of the engine, the ECU 60 controls an operation of the valve member 32 of the clutch 10, that is, energization of the electromagnet 40, as described above. Here, for a control of the electromagnet 40, the ECU 60 sends an operation signal to a relay box 70. Therefore, the ECU 60 is configured to function as a control device for a clutch according to the present disclosure. Incidentally, instead of providing the relay box 70, the ECU 60 may include a relay corresponding to the relay box 70. The control of the valve member 32 will be described later. For these controls, the ECU 60 stores data (including a map) and programs (including a predetermined arithmetic expression)

determined in advance by an experiment and the like. The ECU 60 performs a predetermined arithmetic operation based on an output from the various sensors, and outputs an electronic signal to a drive means (or the operation means) such as an actuator of various types of machines. The ECU 60 has a functional unit corresponding to a control unit of the engine in addition to a functional unit corresponding to a control unit of the valve member 32. These functional units are associated with each other. However, although the electronic control unit is illustrated as one unit in this case, the electronic control unit may be configured by a plurality of units, and in this case, the plurality of units are capable of transmitting and receiving signals between the units.

A control of the clutch 10 in the engine system having the above configuration will be described below.

As described above, the ECU 60 has the functional unit corresponding to the control unit of the valve member 32. The functional unit includes sub-functional units corresponding to a desired rotation speed calculation unit (a first calculation unit), a proportional term manipulated variable calculation unit (a second, calculation unit), a feedforward manipulated variable calculation unit (a third calculation unit), an integral term manipulated variable calculation unit (a fourth calculation unit), and a valve member control unit, respectively, and these are associated with each other.

The desired rotation speed calculation unit in the ECU 60 will be described first. The calculation unit calculates a desired rotation speed of the fan 52*a* of the cooling fan 52 according to a predetermined program, data, and the like with reference to the temperature of the coolant of the engine detected (acquired) based on the output of the temperature sensor 66 and the vehicle speed detected (acquired) based on the output of the vehicle speed sensor 62. The detected temperature of the coolant of the engine and the vehicle speed are information necessary for setting a desired value (the desired rotation speed) for controlling the tan (a rotating body) 52*a* of the cooling fan 52 serving as an operation machine. Such information is defined herein as "information for the operation machine". Here, basically, the higher the temperature of the coolant, the higher the desired rotation speed is calculated. In addition, basically, a lower desired rotation speed is calculated as the vehicle speed increases. Although the temperature of the coolant is preferably used as the above information, other information may not be used, or further information other than the vehicle speed (for example, at least one of the engine rotation speed, the engine load, and the rotation speed of the rotation shaft body 12) may be used additionally or alternatively to the vehicle speed.

Next, the proportional term manipulated variable calculation unit in the ECU 60 will be described. The calculation unit refers to the calculated desired rotation speed of the fan 52*a* of the cooling fan 52 and the rotation speed of the fan 52*a* detected (acquired) based on the output of the rotation speed sensor 68. The detected rotation speed of the fan 52*a* is used to calculate the angular acceleration of the fan 52*a*. In addition, a deviation between the desired rotation speed of the fan 52*a* and the detected rotation speed of the fan 52*a* is obtained, and the deviation is multiplied by a predetermined coefficient to calculate a desired value (a desired angular acceleration) of the angular acceleration of the fan 52*a*. Then, the ECU 60 multiplies the deviation between the calculated desired angular acceleration of the fan 52*a* and the calculated angular acceleration by a proportional gain to calculate a proportional term manipulated variable based on the deviation between the angular acceleration of the fan 52*a* that is the rotating body and the desired angular acceleration.

Next, the feedforward manipulated variable calculation unit in the ECU 60 will be described. The calculation unit refers to the detected (acquired) rotation speed of the rotating shaft body 12 that is the drive shaft and the calculated desired rotation speed of the fan 52*a*. The rotation speed of the rotating shaft body 12 is detected based on the output of the engine rotation speed sensor 64. Data indicating a relationship between the rotation speed of the rotating shaft body 12 that is the drive shaft and the rotation speed of the fan 52*a* is determined in advance by an experiment. Therefore, a feedforward manipulated variable is calculated by performing a predetermined calculation operation with reference to the detected rotation speed of the rotating shaft body 12 and the calculated desired rotation speed of the fan 52*a* using the data.

Next, the integral term manipulated variable calculation unit in the ECU 60 will be described. The calculation unit refers to the calculated desired rotation speed of the fan 52*a* of the cooling fan 52 and the detected rotation speed of the fan 52*a*. Further, the ECU 60 integrates the deviation between the calculated desired rotation speed of the fan 52*a* and the detected rotation speed of the fan 52*a* and multiplies them by an integral gain to calculate an integral term manipulated variable.

When the proportional term manipulated variable, the feedforward manipulated variable, and the integral term manipulated variable are obtained in this way, the valve member control unit in the ECU 60 sends the operation signal based on them to the relay box 70 so as to control the operation of the valve member 32. The operation signal at this time is a signal in which the sum of the proportional term manipulated variable, the feedforward manipulated variable, and the integral term manipulated variable is used as a controlled variable.

The control described above will be further described below.

First, attention is focused on the deviation of the rotation speed of the rotating shaft body 12 that is the drive shaft and the rotation speed of the fan 52*a* of the cooling fan 52. In a proportional control focusing attention on the rotation speed, for example, even if the oil in and out of the torque transmission chamber is controlled to be zero at a timing at which the deviation of the rotation speed becomes zero, the rotation speed of the fan cannot be controlled to the desired rotation speed. Therefore, a differential control is required.

By making use of the differential control (a differential term), it is possible to make the rotation speed of the fan follow the desired rotation speed by making a response of the rotation speed of the fan slow. However, in this case, there is a limit to an improvement in a response followability.

In order to enhance the response followability, the present inventor focused attention on the angular acceleration on the secondary side (fan 52*a*). By focusing attention on the angular acceleration and performing the proportional control, when the rotation speed on the secondary side is lower than the desired rotation speed, a large amount of oil can be filled in the torque transmission chamber and the rotation speed of the fan can be quickly increased. On the contrary, in the control, when the rotation speed approaches the desired rotation speed, the oil can be extracted from the torque transmission chamber and the rotation speed of the fan can be suitably maintained.

Figure 3:
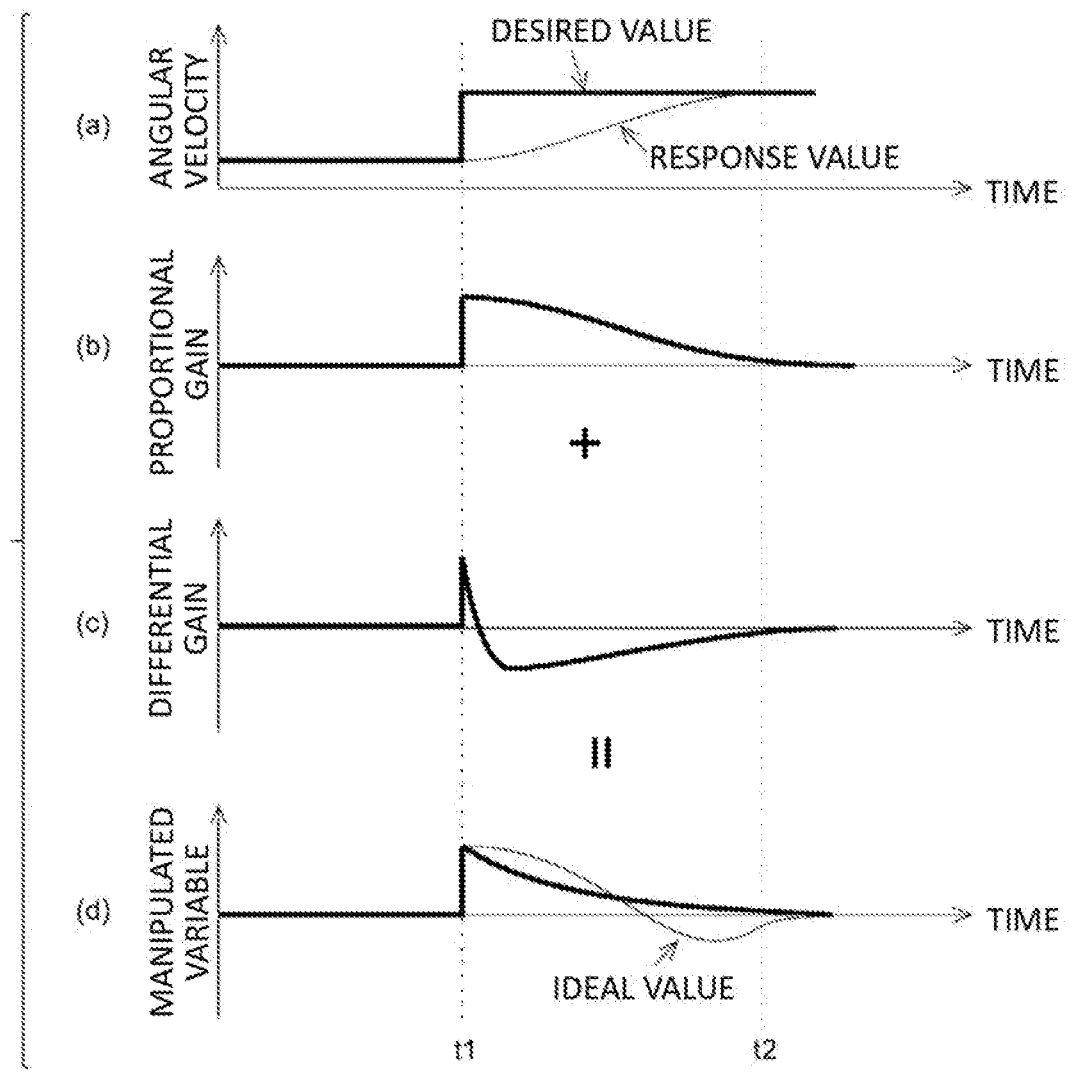
FIG. 3 is a graph schematically showing a control example in a case of focusing attention on an angular velocity on a secondary side.

Here a case of focusing attention on the angular velocity, and a case of focusing attention on the angular acceleration are compared. FIG. 3 schematically shows an example in a case of focusing attention on the angular velocity. A relationship between a desired value of the angular velocity of the fan on the secondary side and a response value is shown in (a) of FIG. 3. The proportional gain and a differential gain for the angular velocity of the fan are shown in (b) and (c) of FIG. 3, respectively. Even when a so-called PD control is performed using these, since time elapses after an actual operation amount (supplied amount of oil) (a thick line in (d) of FIG. 3) of the valve member departs from an ideal operation amount (a thin line in (d) of FIG. 3) as shown in (d) of FIG. 3, a considerable time is required to bring the rotation speed of the fan closer to the desired rotation speed.

Figure 4:
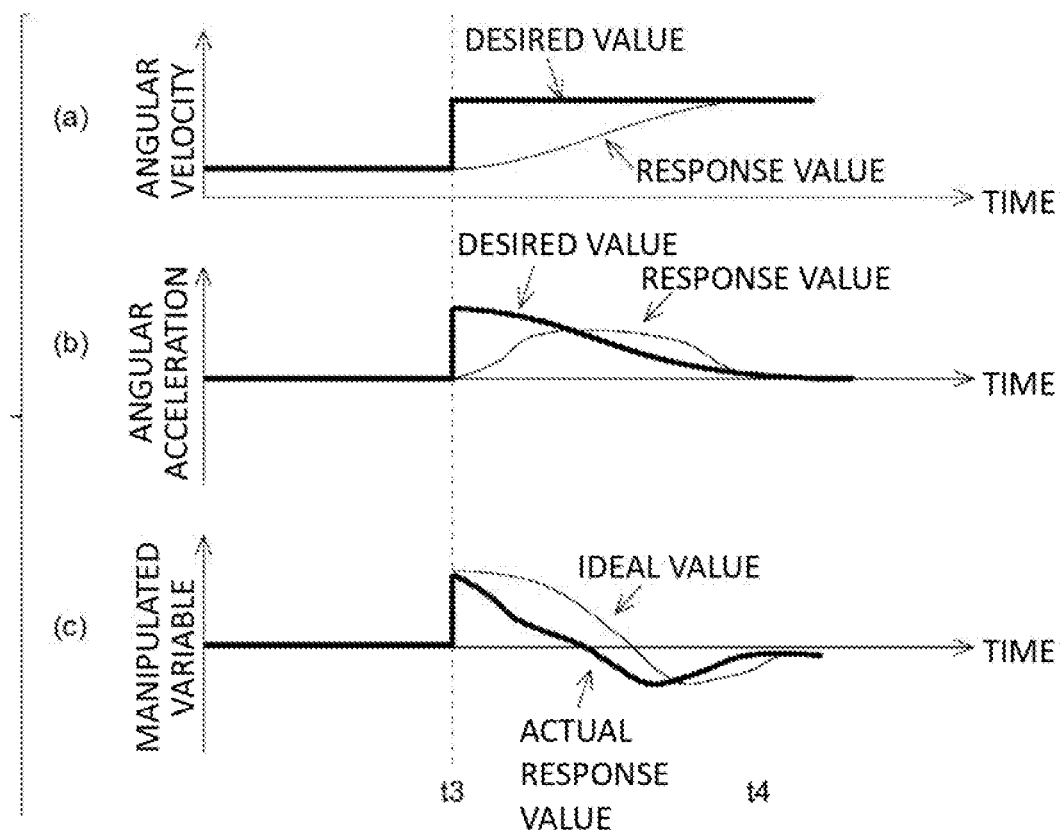
FIG. 4 is a graph schematically showing a control example in a case of focusing attention on an angular acceleration on the secondary side according to the embodiment.

FIG. 4 shows an example in a case of focusing attention on the angular acceleration. (a) of FIG. 4 corresponds to (a) of FIG. 3. A line of the desired value of the angular velocity of the fan in (a) of FIG. 4 is represented by the angular acceleration, as shown in (b) of FIG. 4. The angular acceleration of the fan can be responded to the desired value of the angular acceleration in (b) of FIG. 4 as shown by a thin line in (b) of FIG. 4 by the control. The amount of oil supplied to the torque transmission chamber, that is, the operation amount of the valve member is shown in (c) of FIG. 4. A thin line in (c) of FIG. 4 corresponds to the desired values in (a) and (b) of FIG. 4, On the other hand, when the change in the manipulated variable (the proportional term manipulated variable) of the proportional control (the proportional gain) is examined by the experiment, it is found that the response is indicated by a thick line in (c) of FIG. 4. As is clear from FIG. 4, in order to improve the response followability of the rotation speed on the secondary side, in the case of FIG. 4, it is effective to rapidly increase the supplied amount of oil (to approach the desired value), and then turn it to a negative value. As shown in (c) of FIG. 4 (in particular, with reference to a thick line), by focusing attention on the angular acceleration, the negative value (reduction of the amount of oil after approaching the desired value) can be appropriately realized, and therefore a high response followability can be realized. Incidentally, in FIGS. 3 and 4, a scale of a horizontal axis (a time axis) is different, and a period t1-t2 in FIG. 3 is twice to three times a period t3-t4 in FIG. 4.

Although the response followability can be enhanced by focusing attention on the angular acceleration on the secondary side, there is a limit in order to maintain the rotation speed on the secondary side at the desired rotation speed. On the other hand, it is desirable to avoid the response followability being impaired by combining other controls. As a result of further intensive studies by the present inventors, in the present embodiment, the valve member is controlled by combining a feedforward control, and an integral control is combined as described above in order to further suitably suppress deviation of the feedforward control. In this way, that is, as described above, by controlling the combination of the proportional term manipulated variable focusing attention on the angular acceleration and the feedforward manipulated variable and the integral term manipulated variable focusing attention on the rotation speed, the rotation speed on the secondary side can be suitably maintained at the desired rotation speed while improving the response followability.

Although an embodiment according to the present disclosure has been described above, in the control of the valve member, the valve member may be controlled based only on the proportional term manipulated variable focusing attention on the angular acceleration. This is because it is possible to achieve at least the original purpose of ensuring the high response followability.

In the above embodiment, the operation machine on the secondary side (that is, a driven device) is a cooling tan, but the operation machine may be other than the cooling fan. For example, the operation machine may be an engine coolant pump. In this case, the clutch may be connected to a rotor side of the coolant pump (a vane pump). Further, the drive shaft of the clutch is not limited to being connected to the output shaft of the engine, and may be connected to a shaft member and the like of another power source.

Although the representative embodiment of the present disclosure have been described above, the present disclosure may be modified in various ways. Various substitutions and changes are possible without departing from the spirit and scope of the present disclosure as defined by the claims of the present application.

The present application is based on a Japanese Patent Application (Patent Application No. 2017-195050) filed on Oct. 5, 2017, contents of which are incorporated herein as reference.

INDUSTRIAL APPLICABILITY

The control device for a clutch of the present disclosure is useful in improving the response followability.

LIST OF REFERENCE NUMERALS 10 clutch
12 rotating shaft body (drive shaft)
16 case member
20 partition plate
22 oil reservoir chamber
24 torque transmission chamber
26 drive disk
30 oil recovery vent
32 valve member
34 leaf spring
34b armature
40 electromagnet
42 magnetic loop element (magnetic body)
50 engine
52 cooling fan
52a fan
54 radiator
60 electronic control unit (ECU) (control device)

The invention claimed is:

1. A control device for a clutch provided between a drive shaft and an operation machine,
   wherein the control device is configured to control an operation of a valve member for opening and closing an oil supply port that communicates an oil reservoir chamber with a torque transmission chamber, so as to adjust an amount of oil supplied from the oil reservoir chamber to the torque transmission chamber in the clutch, and
   the control device comprises:
      a first calculation unit that calculates a desired rotation speed of a rotating body of the operation machine with reference to acquired information on the operation machine;
      a second calculation unit that calculates a proportional term manipulated variable based on a deviation between an angular acceleration and a desired angular acceleration of the rotating body with reference to the desired rotation speed of the rotating body of the operation machine calculated by the first calculation unit and an acquired rotation speed of the rotating body of the operation machine; and a valve member control unit that controls an operation of the valve member based on the proportional term manipulated variable calculated by the second calculation unit.

2. The control device for the clutch according to claim 1, further comprising:

a third calculation unit that calculates a feedforward manipulated variable with reference to the desired rotation speed of the rotating body of the operation machine calculated by the first calculation unit and an acquired rotation speed of the drive shaft; and a fourth calculation unit that calculates an integral term manipulated variable with reference to the desired rotation speed of the rotating body of the operation machine calculated by the first calculation unit and an acquired rotation speed of the rotating body of the operation machine, wherein the valve member control unit controls an operation of the valve member based on the proportional term manipulated variable calculated by the second calculation unit, the feedforward manipulated variable calculated by the third calculation unit, and the integral term manipulated variable calculated by the fourth calculation unit.

3. The control device for the clutch according to claim 2, wherein the operation machine is a cooling fan of an engine.

4. The control device for the clutch according to claim 2, wherein the operation machine is a coolant pump of an engine.

5. The control device for the clutch according to claim 1, wherein the operation machine is a cooling fan of an engine.

6. The control device for the clutch according to claim 1, wherein the operation machine is a coolant pump of an engine.

* * * * *